US008468377B2

(12) United States Patent
Scott et al.

(10) Patent No.: US 8,468,377 B2
(45) Date of Patent: Jun. 18, 2013

(54) CONSERVING POWER USING PREDICTIVE MODELLING AND SIGNALING

(75) Inventors: James Scott, Cambridge (GB); Paul Newson, Duvall, WA (US); Raman Sarin, Redmond, WA (US); Eric Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1047 days.

(21) Appl. No.: 12/255,877

(22) Filed: Oct. 22, 2008

(65) Prior Publication Data
US 2010/0100716 A1    Apr. 22, 2010

(51) Int. Cl.
*G06F 1/00* (2006.01)
(52) U.S. Cl.
USPC .......................................... 713/323; 713/320
(58) Field of Classification Search
USPC .................. 713/320, 323–324, 300
See application file for complete search history.

(56) References Cited

U.S. PATENT DOCUMENTS

| | | | |
|---|---|---|---|
| 5,924,017 | A | 7/1999 | Pinter et al. |
| 6,654,895 | B1 | 11/2003 | Henkhaus et al. |
| 7,292,545 | B2 | 11/2007 | Maki et al. |
| 7,340,615 | B2 | 3/2008 | Krantz et al. |
| 7,920,504 | B2 * | 4/2011 | Muqattash et al. ........... 370/318 |
| 2002/0132603 | A1 | 9/2002 | Lindskog et al. |
| 2005/0190714 | A1 | 9/2005 | Gorbatov et al. |
| 2005/0219120 | A1 | 10/2005 | Chang |
| 2005/0233704 | A1 | 10/2005 | Maekawa |
| 2007/0027980 | A1 | 2/2007 | Herrod et al. |
| 2007/0162582 | A1 | 7/2007 | Belali et al. |
| 2008/0005599 | A1 | 1/2008 | Theocharous et al. |
| 2008/0049700 | A1 | 2/2008 | Shah et al. |

OTHER PUBLICATIONS

PCT International Search Report dated Jun. 7, 2010 from corresponding PCT Application No. PCT/US2009/061209 filed Oct. 20, 2009, 4 pages.
"Active Notifications White Paper", Microsoft Corporation, Nov. 2006, pp. 16.
Agarwal, et al., "Dynamic Power Management using On Demand Paging for Networked Embedded Systems", IEEE, 2005, pp. 755-759.
Agarwal, et al., "Wireless Wakeups Revisted: Energy Management for VoIP over Wi-Fi Smartphones", MobiSys 2007, Jun. 11-13, San Juan, Puerto Rico, USA, ACM, 2007, 13 pages.
Agarwal, et al., "On Demand Paging Using Bluetooth Radios on 802.11 Based Networks", CECS, Jul. 2003, 19 pages.

(Continued)

*Primary Examiner* — Clifford Knoll
(74) *Attorney, Agent, or Firm* — Zete Law, P.L.L.C.; MacLane C. Key

(57) ABSTRACT

Methods and systems for conserving power using predictive models and signaling are described. Parameters of a power management policy are set based on predictions based on user activity and/or signals received from a remote computer which define a user preference. In an embodiment, the power management policy involves putting the computer into a sleep state and periodically waking it up. On waking, the computer determines whether to remain awake or to return to the sleep state dependent upon the output of a predictive model or signals that encode whether a remote user has requested that computer remain awake. Before returning to the sleep state, a wake-up timer is set and this timer triggers the computer to subsequently wake-up. The length of time that the timer is set to may depend on factors such as the request from the remote user, context sensors and usage data.

20 Claims, 11 Drawing Sheets

OTHER PUBLICATIONS

Allman, et al., "Enabling an Energy-Efficient Future Internet Through Selectively Connected End Systems", ACM SIGCOMM HotNets, 2007, pp. 1-7.
Anand, et al., "SelfTuning Wireless Network Power Management", ACM MobiCom 2003 (1581137532/03/0009), pp. 176-189.
"Autonomous Mode Operation for Marvell USB 8388", retrieved on Sep. 27, 2007, at http://dev.laptop.org/ticket/1060, >>, pp. 5.
Bahl, et al., "Wake on Wireless—a Case for Multi Radio Wireless LAN", Apr. 4, 2002, pp. 47.
Benini, et al., "A Survey of Design Techniques for System-Level Dynamic Power Management", IEEE VLSI Transactions (1063 8210/00), vol. 8, No. 3, 2000, pp. 299-316.
Borisov, et al., "Generic Application-Level Protocol Analyzer and its Language", Microsoft Research, MSR-TR-2005-133, 2005, pp. 1-15.
"Cell2Notify: Caller ID Based Notifications on Smartphones", at <<http://research.microsoft.com/netres/projects/cell2notify/>>, Microsoft Corporation, 2007, pp. 1.
Christensen, et al., "The next frontier for communications networks: Power management", Computer Communications, vol. 27, No. 18, 2004, pp. 1758-1770.
Douglis, et al., "Thwarting the Power-Hungry Disk", USENIX Winter Technical Conference, 1994, pp. 292-306.
"Edison Software", <<http://www.verdiem.com/edison/>>.
Flautner, "Automatic Performance Setting for Dynamic Voltage Scaling", MobiCom 2001, pp. 260-271.
Flinn, et al., "Managing Battery Lifetime with Energy-Aware Adaptation", ACM Transactions on Computer Systems, vol. 22, No. 2, 2004, pp. 137-179.
"Full TCP Offload", retrieved on Oct. 23, 2008 at <<http://msdn.microsoft.com/en-us/library/aa503758(printer).aspx>>, Microsoft Corporation, <<http://www.microsoft.com/whdc/device/network/TCP_Chimney.mspx>>, 2008, pp. 1.
Gunaratne, et al., "Managing energy consumption costs in desktop PCs and LAN switches with proxying, split TCP connections, and scaling of link speed", John Wiley & Sons, Ltd.: International Journal of Network Management, vol. 15, No. 5, 2005, pp. 297-310.
Gupta, et al., "Greening of the internet", ACM SIGCOMM 2003 (1-58113-735-4/03/0008), 2003, pp. 19-26.
Huang, et al., "Design and Implementation of Power-Aware Virtual Memory", USENIX Annual Technical Conference, 2003, pp. 57-70.
"Intel Centrino Mobile Technology Wake on Wireless LAN (WoWLAN) Feature", Intel Corporation, 2006, pp. 6.
Kravets, et al., "Application-Driven Power Management for Mobile Communication", Wireless Networks, vol. 6, No. 4, 2000, pp. 263-277.
Kumar, et al., "Single-ISA Heterogeneous Multi-Core Architectures: The Potential for Processor Power Reduction", Proceedings of the 36th International Symposium on Microarchitecture, Dec. 2003, pp. 12.
"Live Mesh", <<http://www.mesh.com/Welcome/Welcome.aspx>>.

Mayo, et al., "Energy Consumption in Mobile Devices: Why Future Systems Need Requirements-Aware Energy Scale-Down", Hewlett-Packard Company, 2003, pp. 10.
Mishra, et al., "Wake-on-WLAN", ACM, 2006, pp. 9.
Mogul, "TCP offload is a dumb idea whose time has come", IEEE HotOS, vol. 9, 2003, pp. 25-30.
Olsen, et al., "Multi-Processor Computer System Having Low Power Consumption", Springer-Verlag Berlin Heidelberg, 2003, pp. 53-67.
"OnNow Power Management Architecture for Applications", retrieved on Aug. 22, 2008 at <<http://msdn.microsoft.com/en-us/library/ms810046.aspx>>, Microsoft Corporation, Dec. 4, 1998, 11 pages.
Pering, et al., "CoolSpots: Reducing the Power Consumption of Wireless Mobile Devices with Multiple Radio Interfaces", ACM, 2006, pp. 220-232.
Pering, et al., "Exploiting Radio Hierarchies for Power-Efficient Wireless Device Discovery and Connection Setup", IEEE, 2005, pp. 6.
"Physically Connecting to a Network or Broadband Modem", at <<http://support.dell.com/support/edocs/system/latd820/en/ug/network.htl>>, Dell, 2007, pp. 12.
Sabhanatarajan, et al., "Smart-NICs: Power Proxying for Reduced Power Consumption in Network Edge Devices", IEEE ISVLSI 2008, pp. 75-80.
"Save Energy in Ethernet devices: Network Connectivity Proxying Enables Existing Power-Management Features to be Utilized more Efficiently", retrieved on Aug. 22, 2008 at <<http://findarticles.com/p/articles/mi_m0CMN/is_3_45/ai_n25451080>>, 5 pages.
Schmid, et al., "Low-Power High Accuracy Timing Systems for Efficient Duty Cycling". retrieved on Aug. 22, 2008 at <<http://nesl.ee.ucla.edu/fw/thomas/fp113-schmid.pdf>>, ISLPED, Aug. 11-13, 2008, Bangalore, India, 6 pages.
Shih, et al., "Wake on Wireless: An Event Driven Energy Saving Strategy for Battery Operated Devices", ACM, 2002, pp. 12.
Simunic, et al., "Dynamic Power Management for Portable Systems", ACM MobiCom 2000, pp. 11-19.
Sorber, et al., "Turducken: Hierarchical Power Management for Mobile Device", pp. 14.
"TCP Offload Engine", retrieved on Mar. 7, 2008 at <<http://en.wikipedia.org/wiki/TCP_Offload_Engine>>, Wikipedia, 2008, pp. 1-5.
"Toshiba Leading Innovation", at <<http://www.toshibadirect.com/td/b2c/ebtext.to?page=r400_micro_f>>, 2007, pp. 2.
U.S. Appl. No. 11/945,104.
"Wake on LAN Technology", retrieved on Oct. 23, 2008 at <<http://www.liebsoft.com/whitepapers/pdf_files/Wake_On_LAN.pdf>>, Lieberman Software Corporation (white paper), 2006, pp. 1-9.
"Wake Up on Lan", retrieved on Aug. 22, 2008 at <<http://wake-up-on-lan.qarchive.org/>>, 4 pages.
"WakeUpOnStandyBy Runs Tasks From Suspend and Hibernate Modes", <<http://www.lifehacker.com.au/tips/2008/10/07/wakeuponstandby_runs_tasks_from_suspend_and_hibernate_modes-2.html>>.

* cited by examiner

US 8,468,377 B2

CONSERVING POWER USING PREDICTIVE MODELLING AND SIGNALING

BACKGROUND

Current computers have high power consumption even when idle. It is beneficial to reduce the power consumption of computing devices for environmental reasons and to reduce operating cost. Additionally, for battery powered devices, reduced power consumption enables increased battery life or alternatively the size, weight and cost of the battery can be reduced.

A number of solutions have been proposed to reduce the power consumption of battery powered computing devices, such as laptop computers and handheld devices. These include mechanisms which shut down or suspend the device, and/or which switch off associated devices, such as a display, when the device is not in use. Factors for determining when a device or its components will not be needed for a period of time and thus can be powered down are typically based in policies that note the amount of time that a device or one or more of its components (e.g., a hard drive) has not been used. When the time period of non-use has exceeded a threshold idle time, the device or component is powered down. The device may subsequently be woken up by the user through user input (e.g. by hitting the space bar or pressing the power button). The devices may also have a reduced power operating mode which is used whenever the device is not connected to mains electricity, e.g. in which the brightness of the display is reduced. Further solutions have been proposed which incorporate additional hardware (e.g. a sensor) within the computing device, which triggers the wake-up of the computing device upon certain events (e.g. detection of a wireless network).

The embodiments described below are not limited to implementations which solve any or all of the disadvantages of known methods of reducing the power consumption of computing devices.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems for conserving power using predictive models and signaling are described. Parameters of a power management policy are set based on predictions based on user activity and/or signals received from a remote computer which define a user preference. In an embodiment, the power management policy involves putting the computer into a sleep state and periodically waking it up. On waking, the computer determines whether to remain awake or to return to the sleep state dependent upon the output of a predictive model or signals that encode whether a remote user has requested that computer remain awake. Before returning to the sleep state, a wake-up timer is set and this timer triggers the computer to subsequently wake-up. The length of time that the timer is set to may depend on factors such as the request from the remote user, context sensors and usage data Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
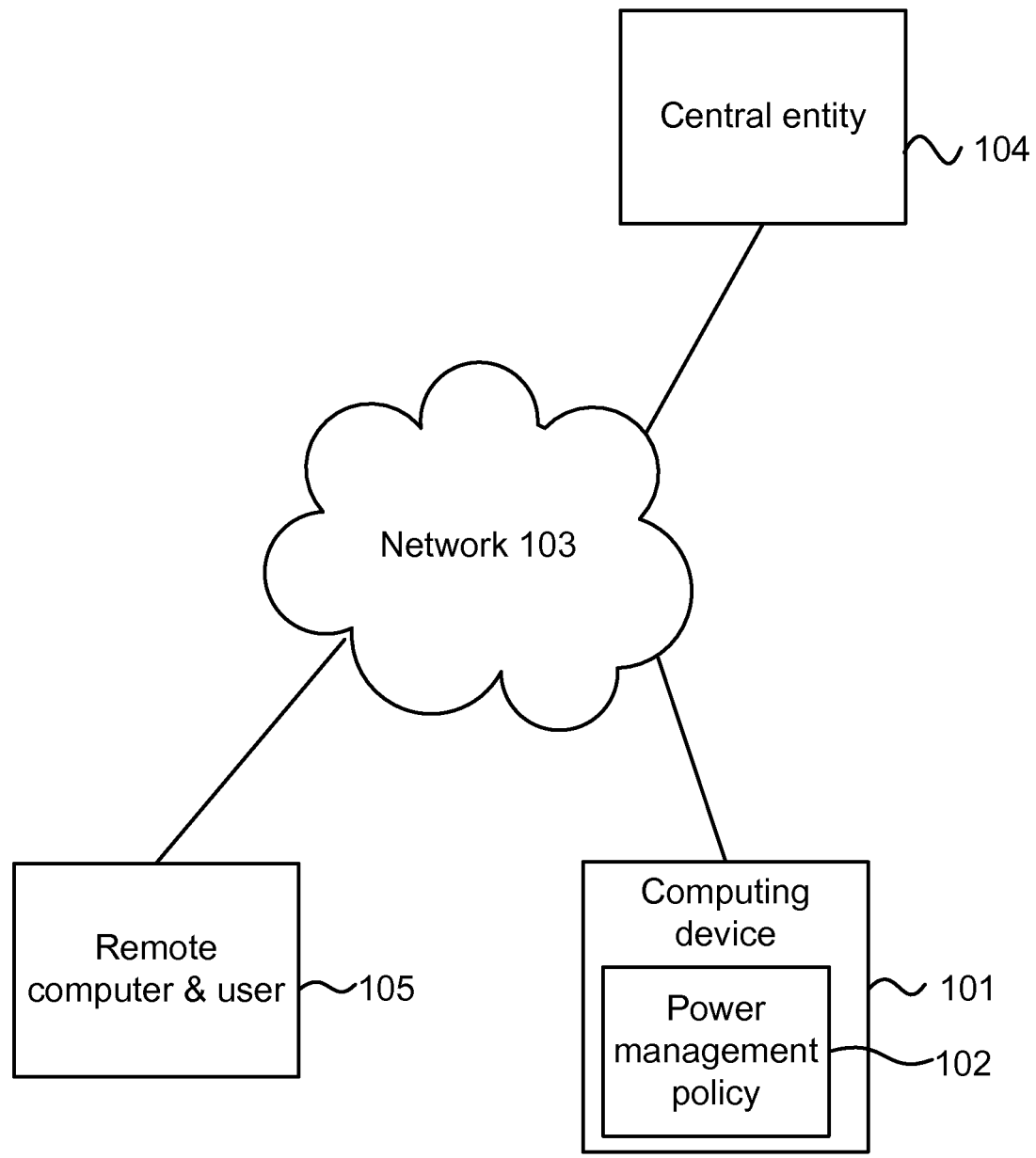
FIG. 1 is a schematic diagram of a system which enables the power consumption of a computing device to be reduced.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, in order to reduce the power consumption of a computing device, the device may be switched off (either 'soft off', S5, or mechanical off) or put into a low power mode when it is idle. There are various low power modes which may be used, such as: S1, where the hardware and processor context is maintained, S2, where the processor loses power and the processor context and contents of the cache are lost, S3, which is often referred to as suspend to RAM or standby and S4, which is often referred to as hibernate or suspend to disk. Some operating systems offer a subset of these modes and/or provide other modes (e.g. Microsoft® Windows Vista® provides a hybrid sleep mode in which the volatile RAM is written to non-volatile disk (like hibernate) before entering standby mode). Whilst a computing device is in one of these lower modes, it is not capable of network communication. Local user input can cause the computing device to wake from one of these low power modes, or from the off state and return to normal operating state (S0). Techniques have been developed which enable the computing device to be awakened from low power modes (e.g. S1-S4) by particular trigger events, but typically these require additional hardware within the computing device, and sometimes within the network as well.

The techniques described below may be used when the computing device enters any available low power mode in which the computing device is still capable of automatically returning to a higher power mode at a future point in time with no external input. For the purposes of the following description, the process of the computing device shutting down or going into any type of low power mode will be referred to as the computing device going to sleep.

Methods and systems for minimizing the power used by a computer are described herein. These methods use a power management policy (e.g. a duty cycling policy) and the power management policy may involve:

the use of usage data or other evidence to identify or to predict if and when users will next use a computing device, and in some examples to identify or to predict the manner in which it needs to be used;

the use of explicit or implicit remote signaling to control the nature and timing of the powering up of a computer; and combinations of forecasts and signaling.

Forecasts of future usage of a device may take advantage of a plurality of implicit evidence, including information about the duration of the time of the non-use of the system and other evidence like time of day, day or week, time since last usage, and information about other activity by the user (e.g., the reading of email on another machine).

FIG. 1 is a schematic diagram of a system which enables the power consumption of a computing device to be reduced. The system comprises a computing device 101 which operates a power management policy 102. The computing device 101 may be connected to a network 103. When networked, the computing device 101 may receive remote signaling from a central entity 104 and/or a remote computing device 105 operated by a remote user, via the network 103. In order to reduce the power consumption of the computing device 101, the power management policy 102 is invoked and the particular power management policy used and/or the parameters of the particular power management policy may be selected based on remote signaling received via the network 103 and/or a predictive model based on usage of the computing device 101.

Figure 2:
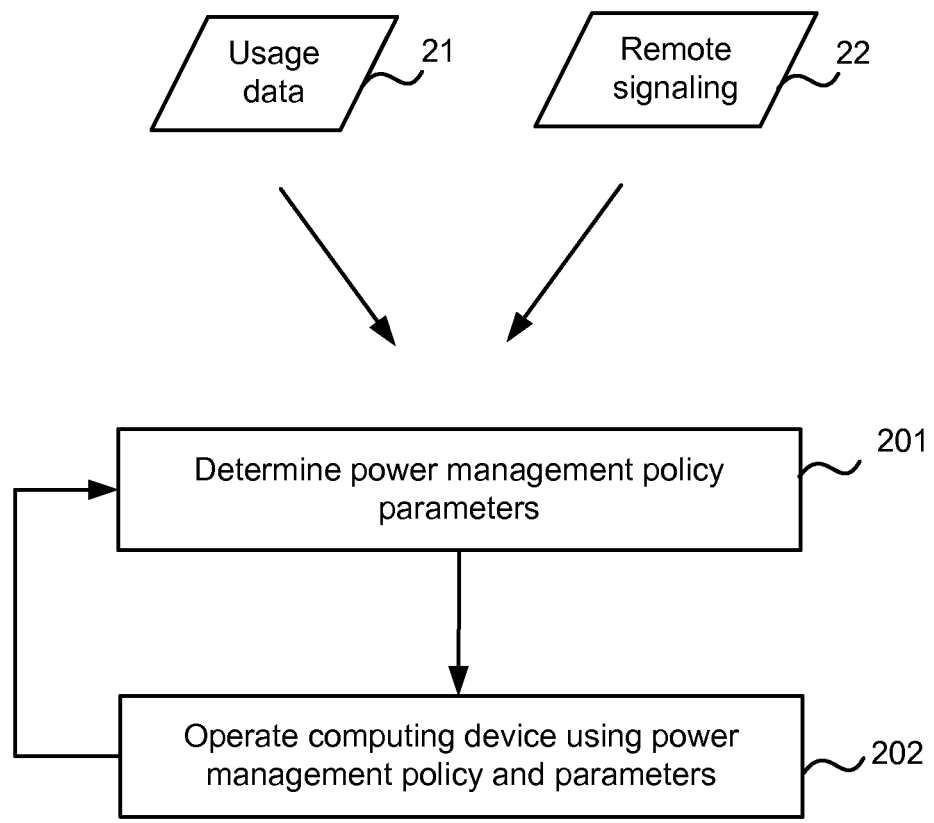
FIG. 2 is a flow diagram of an example method of operation of a computing device in order to reduce its power consumption.

FIG. 2 is a flow diagram of an example method of operation of a computing device, e.g. computing device 101 shown in FIG. 1. Based on various inputs, such as usage data 21 and/or remote signaling 22, parameters of a power management policy may be determined (block 201). The parameters may be set to minimize the expected cost of the computing device (or of part or all of the system) given preferences about the cost of power and the cost of delays in the availability of the computing device or of a computing resource. These preferences about the relative costs may be set by a user (e.g. locally or be received via the remote signaling 22) or on a system wide level.

The power management policy may affect the operation of the entire computing device or may only affect the operation of part of the computing device (e.g. the disk drives, display etc). The usage data 21 may comprise predictions (also referred to herein as 'forecasts') generated by a predictive model based on usage data and/or implicit evidence which is gathered or made available at any time. The remote signaling 22 may comprise implicit or explicit requests that encode the preferences of a remote user (e.g. a request that the computing device remain awake) and these requests may be received in a message from a remote computer (e.g. remote computer 105) or information on this request may be obtained by communicating with a central server (e.g. central entity 104). Given forecasts and/or signals, multiple power management policies can be executed and the inputs 21-22 may be used (in block 201) to select a power management policy in addition to, or instead of, determining parameters for a particular policy.

Having selected the parameters and/or the particular policy to be used (in block 201) the computing device is operated using the policy and parameters (block 202). The process may be repeated (e.g. periodically or substantially continuously) in order to update the parameters and/or policy used based on new input data.

Power management involves implicit or explicit cost-benefit decisions, where costs include the cost of wasted energy, wear and tear spent on computing resources that are otherwise idle and the cost (e.g. to a user) of the suboptimal operation or unavailability of computing resources when they are desired. The latter cost may, for example, be captured as the cost of the delay associated with waiting for the booting up or the powering up of a computer device or a resource associated with the computing device (e.g., the spinning up of a power-saving idle hard drive spindle before it is available for reading and writing). Value can, for example, be expressed in terms of the availability of a computing device/resource and power savings. Methods can implicitly or explicitly minimize costs or maximize benefits or, more generally, optimize the expected utility of a power policy given the preferences of users.

Taking a cost-benefit perspective allows the formal or heuristic control of parameters of various power-management policies based on actions that are available to a computing system. The methods may be applied to a computing device as a whole and/or to components of a computing device such as a display or disk drives. Other applications include a smart screensaver which serves to protect and/or lock a computing device given a prediction that a user will not need to use the device.

One example of a power management policy is a duty cycling policy and this is described in more detail below. The control of an on-off duty cycle provides a means for trading off the costs of power usage with the value of having a system available when a user or system needs access to the computing resources. The methods and systems described herein are not limited to power management policies which involve duty cycling and other power management policies or techniques may alternatively be used, such those which involve remaining in a partially powered state or states over time.

Where duty cycling is used, the frequency and duration of periods of powering one or more components up and down may be controlled as a function of predictions or forecasts about current needs or future desired uses, and/or with the receipt of implicit or explicit signals. Raising the amount of time a system is awake will increase the probability of availability of a computing device or resource, but at an increasing cost of power usage. Probabilistic forecasts about the likelihood of desired usage of a system within some time horizon can be generated by predictive models constructed with machine learning methods, taking into consideration data about the use and non-use of systems over time and other contextual data such as time of day, day of week, and calendar information. The following description describes embodiments which use a power management policy involving duty cycling in more detail.

Figure 3:
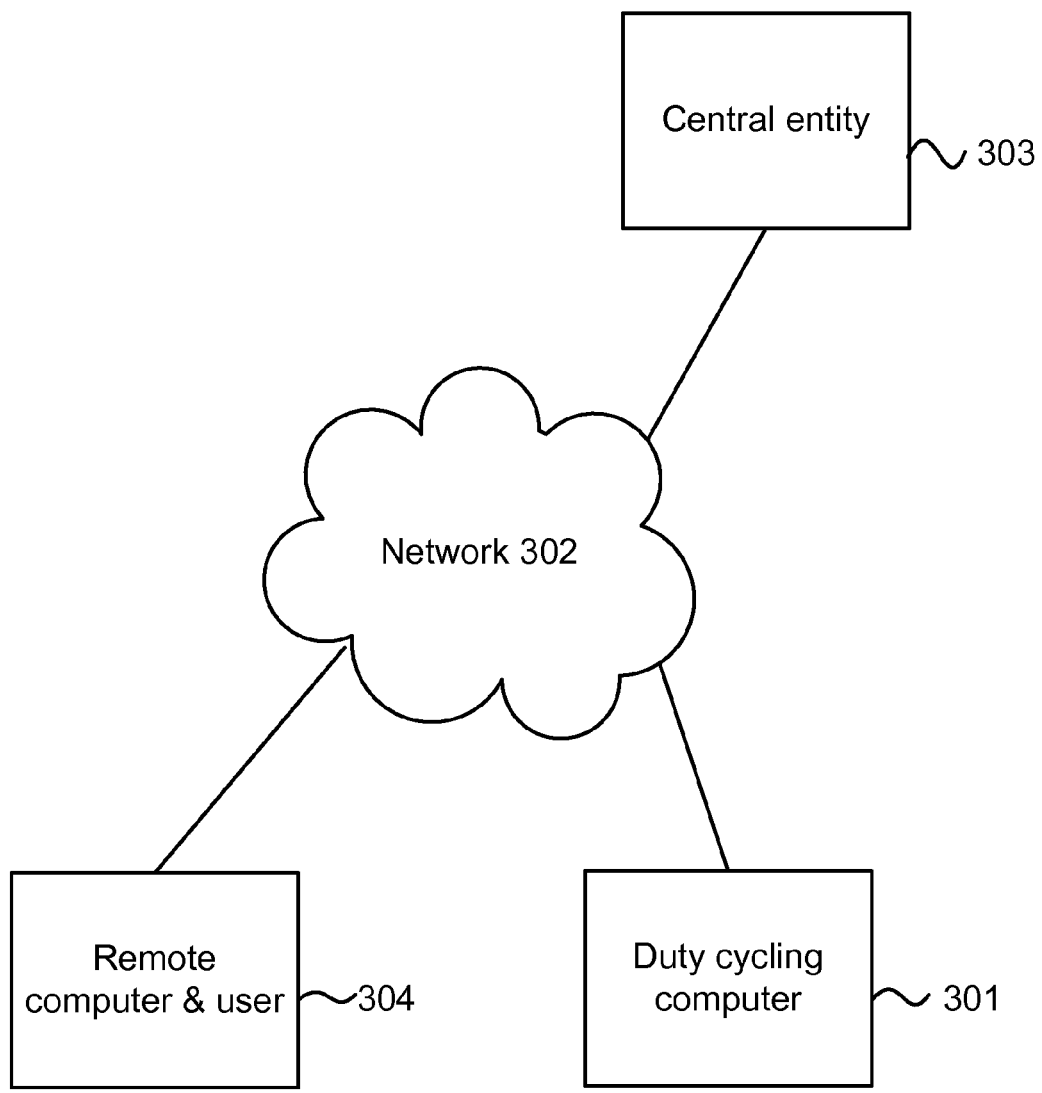
FIG. 3 is a schematic diagram of another system which enables the power consumption of a computing device to be reduced.

FIG. 3 is a schematic diagram of a system which enables the power consumption of a computing device to be reduced, whilst still enabling a user to remotely access the computing device. The system comprises a computing device 301 which may be connected to a network 302. When networked, the computing device 301 can connect to a central entity 303 and/or a remote computing device 304, operated by a remote user, via the network 302. In order to reduce the power consumption of the computing device 301, the computing device is duty cycled, i.e. the computing device is put to sleep and periodically wakes up for a period of time before going back to sleep again. For purposes of explanation only, this computing device 301 may be referred to as the duty cycling computer to distinguish it from the remote computer 304, although the remote computer may also be duty cycled. Furthermore, as described above, alternative power management policies may be used instead of duty cycling.

Figure 4:
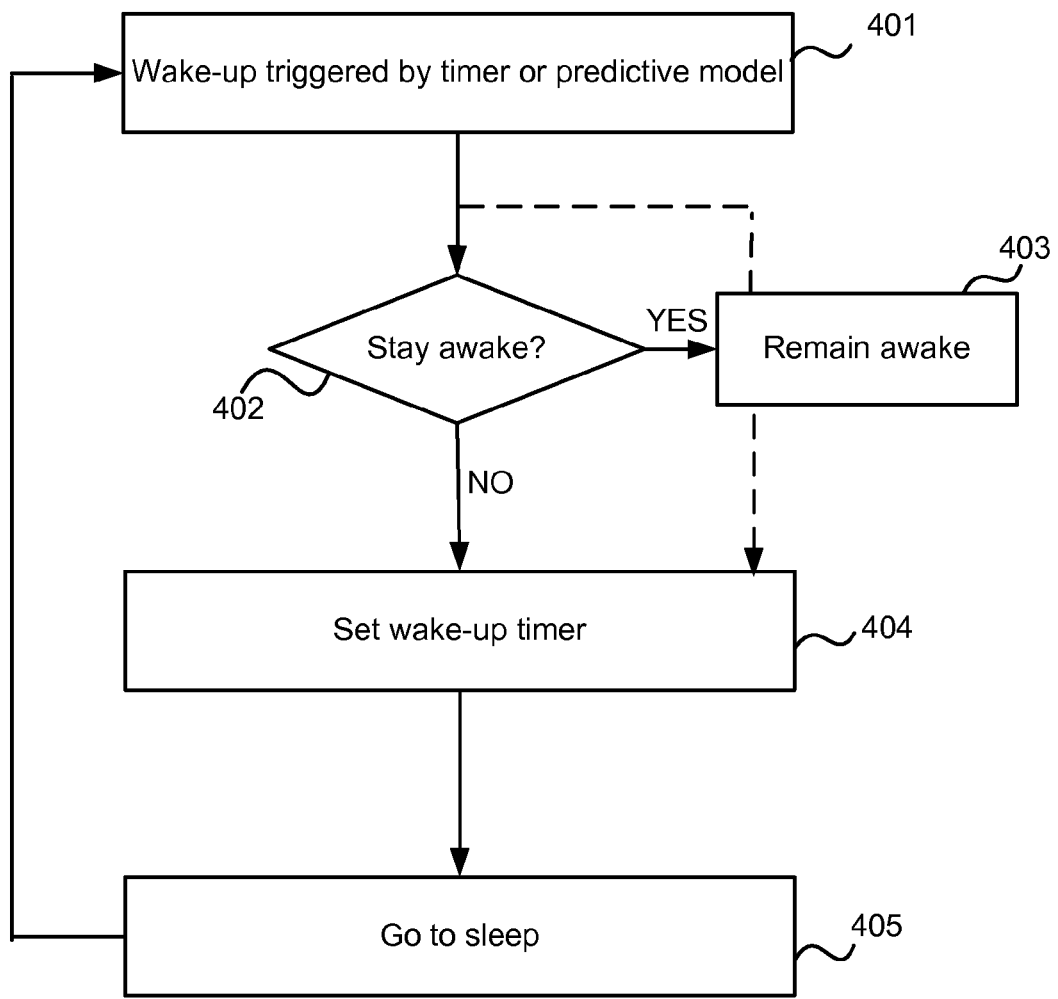
FIG. 4 is a flow diagram of an example method of operation of a duty cycling computer.

FIG. 4 is a flow diagram of an example method of operation of the duty cycling computer 301. The waking of the computing device may be triggered by a timer or by a predictive model. (block 401). Where a predictive model is used, this may forecast the nature and timing of the current or future use of the computing system. Such a predictive model may have access to such data as the use and non-use of a computing system or other evidence as described above. The waking of the device (in block 401) may be independent of any local user input triggered wake-up mechanism (e.g. by pressing the on button, space bar etc). On wake-up, the computing device determines whether it should stay awake (block 402) and this determination step is described in more detail below. Such a determination may be performed via an update to the predictive model and/or receipt of a signal from a remote computing device which is indicative of a user request. The determination may also involve the detection of other types of evidence (e.g., the approaching of a user to the machine). If it is determined that the computing device should remain awake, ('Yes' in block 402), this occurs (block 403), although the computing device may subsequently go back to sleep (e.g. as indicated by the dotted lines in FIG. 4). If it is determined that the computing device should not remain awake ('No' in block 402), a wake-up timer is set (block 404) and the computing device goes to sleep (block 405). The process is then repeated, with the computing device waking (in block 401) when the wake-up timer expires.

The determination of whether the computing device should remain awake (and/or the revision of parameters of the duty cycle such as the length of time that the computing device remains awake in block 403 and the time used to set the wake-up timer in block 404) may be made based on the output of the predictive model or other evidence and in some examples multiple sources of evidence may be used. The decision to stay away can also be determined in full or part by the implicit or explicit signals available via the network 302.

In an example, the determination made (in block 402) is based on the presence and/or content of an input from a remote user via the remote computer 304. This input from the remote user may also be used to determine how long the computing device remains awake for (e.g. in block 403) and/or how long the computing device stays asleep for (i.e. it may affect the setting of the wake-up timer in block 404). The input may be communicated to the duty cycling computer 301 via a central entity 303 or without involving a central entity (e.g. using a message sent from the remote computer 304 to the network address of the duty cycling computer 301). In a further example, the determination may be made (in block 402) based on a combination of the presence and/or content of such an input and on a predictive model.

Figure 5:
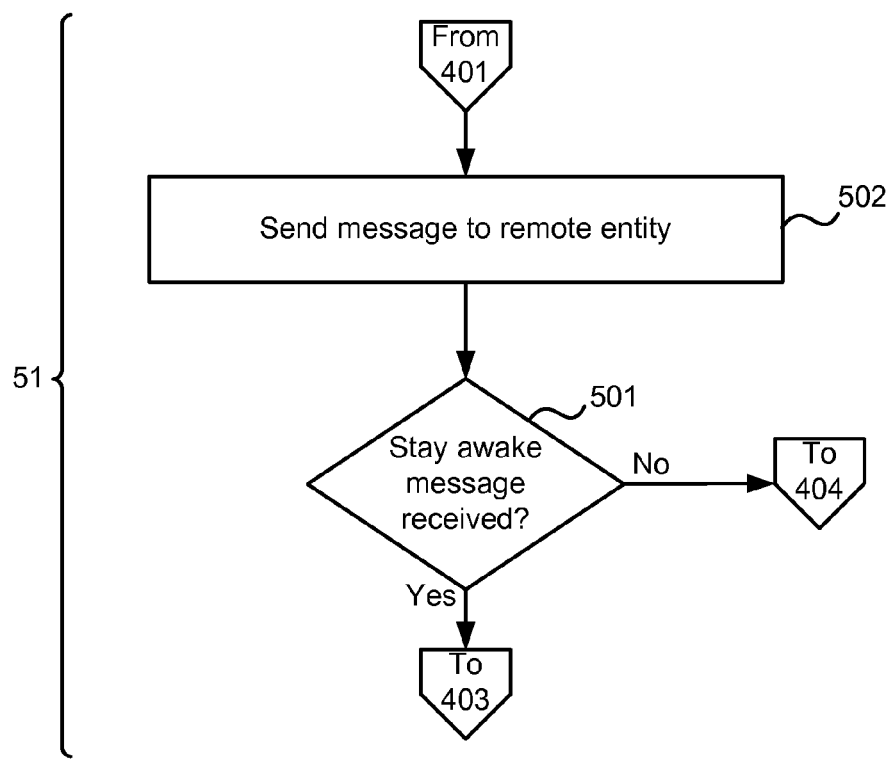
FIG. 5 shows example methods of implementing a method block from FIG. 4.
Figure 5:
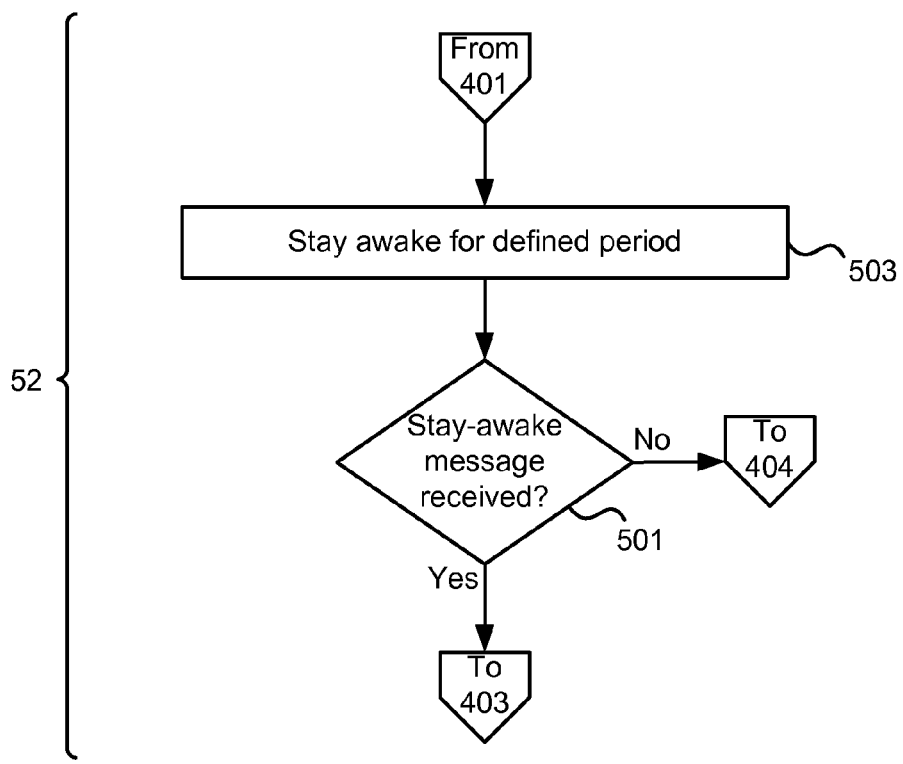

There are many ways in which an input from a remote user via the remote computer 304 can affect the determination made by the duty cycling computer (in block 402) about whether it should stay awake and two examples are shown in FIG. 5. In both examples, 51, 52, the determination is made based on whether a 'stay-awake' message is received (block 501) by the duty cycling computer once it has woken up (in block 401 of FIG. 4). The receipt of any such stay-awake message (in block 501) may be triggered by a message sent by the duty cycling computer to a remote entity (block 502), although this message may be sent to a different remote entity to that which sends the stay-awake message (received in block 501), as described below with reference to FIG. 6. Alternatively, the duty cycling computer may not send any message which triggers the receipt of a stay-awake message but instead may remain awake for a period of time (block 503) and then determine (in block 501) whether any stay-awake message has been received since wake-up (in block 401).

The decision to stay awake and the adjustment of parameters of a duty cycle (or of the power management parameters of any other power management scheme) may be a function of any of: the signals available via a network, signals picked up in other ways (e.g., detecting local activity of a user using sensors, or information that a user who often uses the system is traveling towards the building in a pattern that is seen often when the user enters the office and uses the computer within a particular time period), and predictive models constructed from behavioral data.

In examples which comprise stay-awake messages, it will be appreciated from FIGS. 4 and 5 that the stay-awake message received (in block 501) does not trigger the duty cycling computer to wake-up. As shown in FIG. 4, the waking of the duty cycling computer is controlled by a wake-up timer and/or a predictive model (block 401) and the stay-awake message serves to assist the duty cycling computer in determining whether to stay awake (in block 402, as shown in examples 51 and 52).

Figure 6:
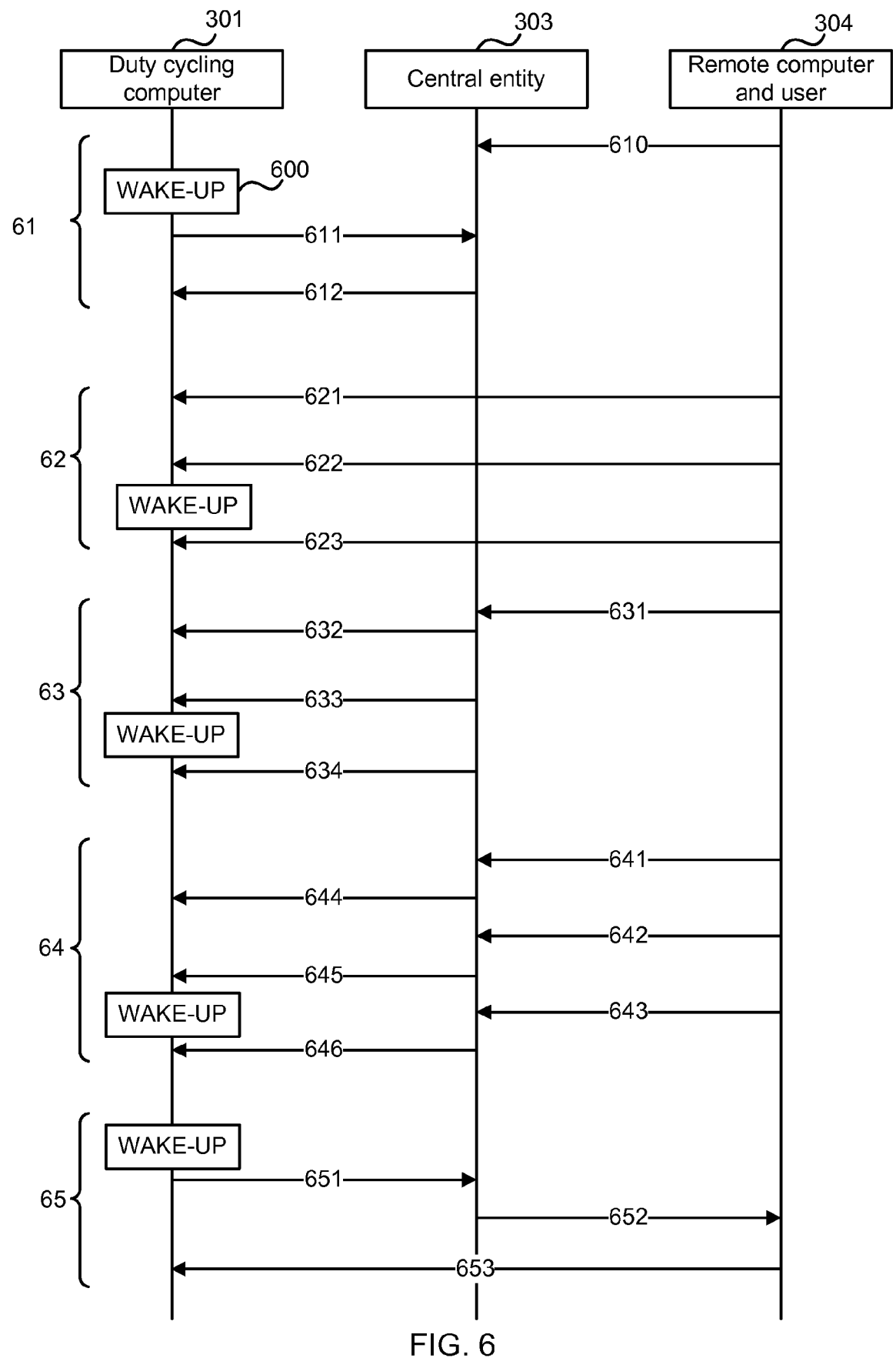
FIG. 6 is a schematic diagram of various example message flows.

Various example scenarios which involve network based signaling (i.e. stay-awake messages) can be described with reference to the example message flows shown in FIG. 6. Whilst FIG. 6 shows a central entity, it will be appreciated that in some examples, there may be no central entity or no central entity may be required. The message flows shown in FIG. 6 demonstrate that the methods described herein may use a push or a pull model.

In a first scenario 61, a remote user may send a message 610 using the remote computer indicating that the user requires the duty cycling computer to remain on when it wakes up. This message 610 may be sent directly to the central entity. Alternatively, the message 610 may be sent to the duty cycling computer but may be cached at the central entity to await wake-up of the duty cycling computer. On wake-up (in block 401, as indicated by box 600 in FIG. 6), the duty cycling computer 301 sends a message 611 to the central entity 303 (block 502). This message may be a polling message, or alternatively the duty cycling computer 301 may log in to the central entity, e.g. where the central entity is a user application server such as an Instant Messenger or Live Mesh server. In response to receiving the message 611, the central entity sends or forwards a stay-awake message 612 to the duty cycling computer 301. The central entity may be aware that the message is a stay-awake message or it may not be so aware (e.g. where the central entity acts as a forwarding entity irrespective of the content or type of message); in the latter case the central entity may nonetheless forward the message.

It will be appreciated that the term Instant Messenger is used herein to refer to any form of real-time communication between users which is based on text and where the users interact using computing devices which are connected together, e.g. via a network 302 which may be the internet.

Many different Instant Messenger products are available and the methods described herein are not limited to any particular implementation or product.

Live Mesh is an example of software which enables a user to access multiple computing devices from any one of a group of computing devices. The software may also enable users to share/synchronize data between those devices and/or to share directories with other users or make directories available irrespective of which of the multiple computing devices they are using. Whilst many of the examples below refer specifically to Live Mesh developed by Microsoft Corporation, the methods described are applicable to other software and systems which provide similar functionality and use of Live Mesh is described by way of example only.

In a second scenario 62, the remote computer 304 periodically sends a stay-awake message 621-623 to the duty cycling computer 301. These stay-awake messages may, for example, be addressed to the IP address (or other network address) of the duty cycling computer. When the duty cycling computer wakes up, the computer stays awake for a period of time (in block 503) in which it listens for stay-awake messages before making a decision about going to sleep (in block 501). In a third scenario 63, the periodic sending of a stay-awake message 632-634 may be performed by the central entity instead of the remote computer. The sending of these messages may be triggered by a single message 631 (or more than one message) received from the remote computer. The periodic stay-awake messages 621-623, 632-634 may, for example, be sent at one second intervals. The duty cycling computer need only stay awake (in block 503) for a short interval (e.g. long enough to re-establish network connectivity and a few seconds to listen for stay-awake messages) in order to receive one of these messages. In a further scenario 64, the central entity 303 may act to forward any messages (or a subset thereof) which it receives. In such an example, the remote computer 304 may periodically send stay-awake messages 641-643 to the central entity 303 and these may be forwarded to the duty cycling computer (messages 644-646). Once the duty cycling computer wakes up, it will receive one of these messages and if the messages are sent sufficiently regularly, the duty cycling computer need only remain awake for a short period of time (which assists in reducing the overall power consumption of the device).

In a fifth scenario 65, the duty cycling computer 301 logs in 651 to the central entity on wake-up (or otherwise informs the central entity that it has woken up) and the central entity publishes presence information 652 relating to the duty cycling computer. In an Instant Messenger (IM) example, an IM client (which may be a modified IM client) may automatically log on to the central entity (an IM server) on wake-up. The presence information may be provided to members of a group which has been previously defined (e.g. a friends list on Instant Messenger or a devices list in Live Mesh). In response to seeing that the duty cycling computer is logged on, the remote computer may send a stay-awake message 653 to the duty cycling computer (either directly, as shown in FIG. 6, or via the central entity). The sending of the stay-awake message may be triggered by an input from the remote user when the user notices the change in presence status of the duty cycling computer, or alternatively, the remote user may have already indicated that the stay-awake message should be sent when the duty cycling computer comes online.

In a variation of the scenarios described above, having received a stay-awake message (e.g. one of messages 612, 623, 634, 646 and 653), the duty cycling computer may send a message in response to the remote computer to request additional feedback, instructions etc. For example, the remote computer may send a stay-awake message to the duty cycling computer. On wake up, the duty cycling computer receives this message and sends a response to the remote computer requesting further information. In response the remote computer may send a message indicating that the duty cycling computer should stay awake for a defined period of time or until a defined time or may provide other information which affects the duty cycling parameters. In other examples, this message sent by the remote computer may detail operations that need to be performed. In some examples, the remote computer may send a further message which triggers the duty cycling computer to set the wake-up timer (in block 404) and go to sleep (block 405).

The stay-awake messages received by the duty cycling computer (e.g. in block 501) may have any suitable form. In an example, where the central entity 303 is an Instant Messenger server, the messages may comprise IM messages which include pre-defined text, such as 'wake up' or 'stay awake'. In determining whether to stay awake (in block 402), the duty cycling computer may parse any IM messages received to see if they include the pre-defined text. In other examples, (e.g. where the central entity is not an IM server or where there is no central entity), any messages received by the duty cycling computer following wake-up may be similarly parsed to identify any trigger text which has been pre-defined to cause the computer to remain awake. In other examples, binary messages or emails may be used. In an example implementation using Live Mesh, the stay-awake messages may be integrated as part of the protocols used by Live Mesh to share state information between the clients and the servers.

In addition to simply causing the duty cycling computer to remain awake, either indefinitely or for a period of time, a stay-awake message may contain other instructions or trigger text which affects the operation of the duty cycling computer. For example, the stay-awake message may affect the length of time that the duty cycling computer stays awake for (in block 403) and/or the length of time that the duty cycling computer goes to sleep for (i.e. by influencing the setting of the wake-up time in block 404). For example, text of 'stay awake 30' or 'wake up 30' in an IM message may cause the duty cycling computer to stay awake for 30 minutes (in block 403) before setting the wake-up timer (in block 404) and going back to sleep (in block 405). In another example, text of 'sleep 30' may cause the wake-up timer to be set to 30 minutes, thereby causing the duty cycling computer to wake again (in block 401) after 30 minutes (unless wake-up is triggered by another event, such as user input) in the intervening period. In a further example, the text may specify a time, e.g. 'wake up 11.00', at which the duty cycling computer should wake up.

In further examples, the stay-awake messages may provide more detailed instructions of operations to be performed by the duty cycling computer or more complex conditions which specify when the duty cycling computer may return to sleep. For example, the stay-awake message may identify a file to be uploaded (e.g. to the central entity or to the remote computer) or other operation to be performed whilst the duty cycling computer is awake (in block 403), e.g. running a batch job and uploading the output to a remote location. In some examples, the stay-awake messages may contain executables and/or a script that causes the computing device to download and run an executable. Once the specified operation (or operations) has been completed, the duty cycling computer may set the wake-up timer (in block 404) and go to sleep (in block 405). In another example, the stay-awake message may identify an event (e.g. the access of a file by the remote user) after which the duty cycling computer may return to sleep (blocks 404-405).

There are many ways in which the remote user may trigger the sending of a stay-awake message. In an IM example, a user may send an IM message (e.g. including trigger text, as described above). In a Live Mesh example, a user may select an option in relation to one of their devices to request that it stays awake (e.g. which may change the state of that device within the Live Mesh system). When the duty cycling computer wakes up and logs on to the Mesh service, it may receive this state information as a stay-awake message. Where the system includes a central entity, the central entity may provide a user interface (e.g. a web page, toolbar etc) which enables a user to request that a duty cycling computer wakes up (and therefore triggers the sending of a stay-awake message). This user interface may also provide the user with the ability to set other preferences relating to the wake up, for example to influence the time that the duty cycling computer stays awake or asleep, or to define operations that should be performed on wake up.

As described above, the period of time for which the duty cycling computer stays awake (in block 403) and the length of time for which the duty cycling computer goes to sleep (as set in block 404) may be influenced by any stay-awake messages received. For example, if a computer is receiving many stay-awake messages, it may enter a more active duty cycle in which it wakes more often (e.g. the length of time for which the duty cycling computer goes to sleep may be reduced). The period of time that the duty cycling computer stays awake for and the period of time that the duty cycling computer goes to sleep for may be referred to collectively as 'duty cycling parameters', although it will be appreciated that different factors may influence the length of time that the duty cycling computer stays awake and the length of time the duty cycling computer goes to sleep for.

Figure 9:
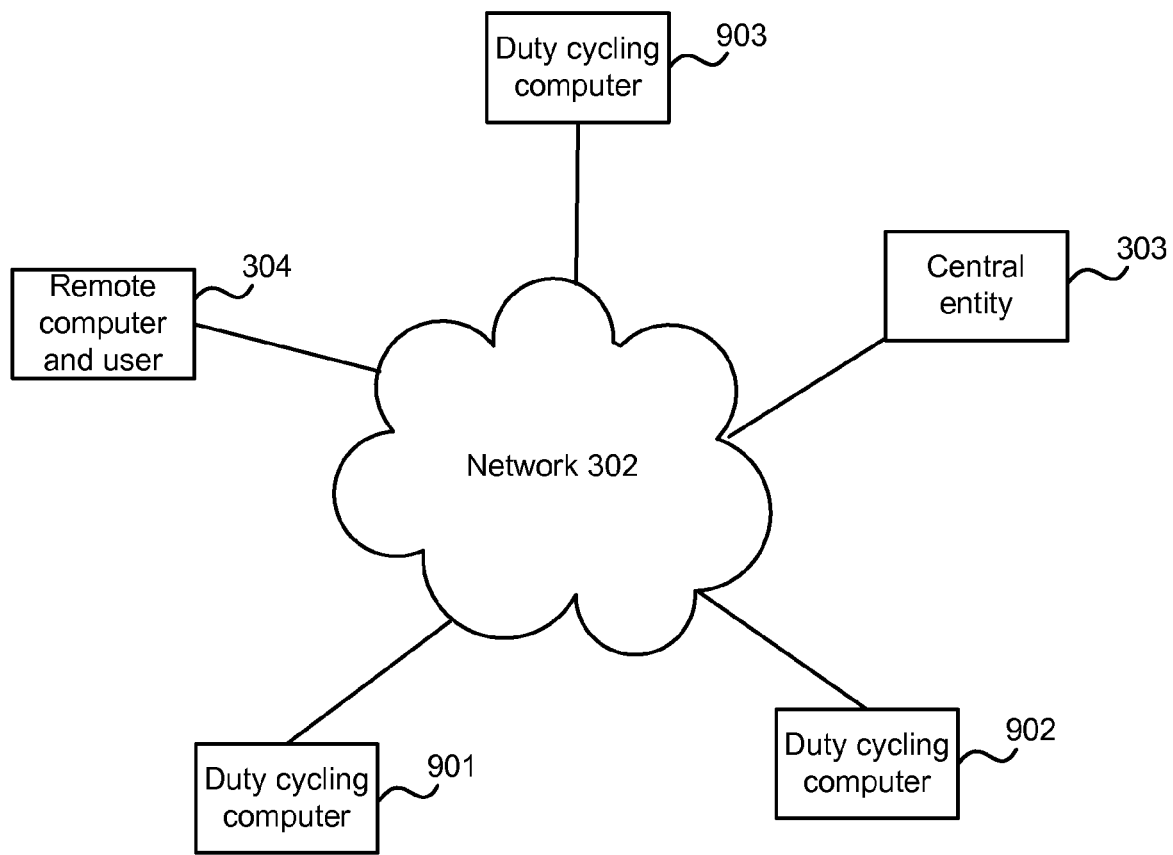
FIG. 9 is a schematic diagram of a system which comprises more than one duty cycling computer.

In addition, or instead, the duty cycling parameters may be set based on user configuration (which may be set locally or remotely, e.g. using the Live Mesh system), stored parameters, context sensors and/or learning algorithms. Duty cycle targets may also be specified (e.g. target ratios of time on to time off for the duty cycling computer) and in such an example, the duty cycling parameters may be set within the constraints of these targets. Where context sensors are used, these may physical sensors and/or virtual sensors and these may affect the setting of the duty cycling parameters based on location, time of day, proximity of users, planned or historical activity of users, other circumstances etc. Physical sensors may be local to (e.g. collocated with) the duty cycling computer, e.g. motion sensors such as Passive Infra Red (PIR) sensors (e.g. to detect users in the vicinity of the duty cycling computer) or accelerometers (e.g. to detect when laptops are being moved). In addition, or instead, remotely accessed physical sensors may be used, e.g. a GPS device in the user's car or context sensors which are associated with the remote computer or central entity. Virtual context sensors may be used which can include checking of a user's calendar, checking a user's presence information (e.g. using IM) etc.

Where context information is used, this may be stored locally (e.g. on the duty cycling computer), stored at the central entity or another central entity and/or shared between computing devices (e.g. where the system comprises more than one duty cycling computer, as shown in FIG. 9). The duty cycling computers may coordinate their duty cycling, for example so that one computer is always awake out of a set of computers (and therefore ready to serve a remote user's needs), or at least one of a set of computers holding a resource (e.g. a directory of files, or a license to an application accessed over remote desktop) is awake. In another example, the coordination may ensure minimum or zero wait time between a user requesting access to a resource and the resource being available, whilst still enabling most of the duty cycling computers to be asleep at any one time. The duty cycling computers may also coordinate to wake up (periodically) at the same time so that they can share context information between themselves (e.g. once per hour or once per day), thus enabling context-based optimization of duty cycles because they get information from each other. Alternatively, the sharing (or replication) of context information between duty cycling computers may be performed according to a schedule or an ad-hoc basis as each machine wakes.

Machine learning may be used to model a user's behavior and dynamically adjust the duty cycling parameters based on this model. For example, during the night, a work computer may sleep for 15 minutes and only wake for 5 seconds since it is highly unlikely that a remote user will want to access it. In another example, the model may learn that a user always requires access to the duty cycling computer at a particular time (e.g. 12 noon) and may ensure that the computer is always awake at this time.

Figure 7:
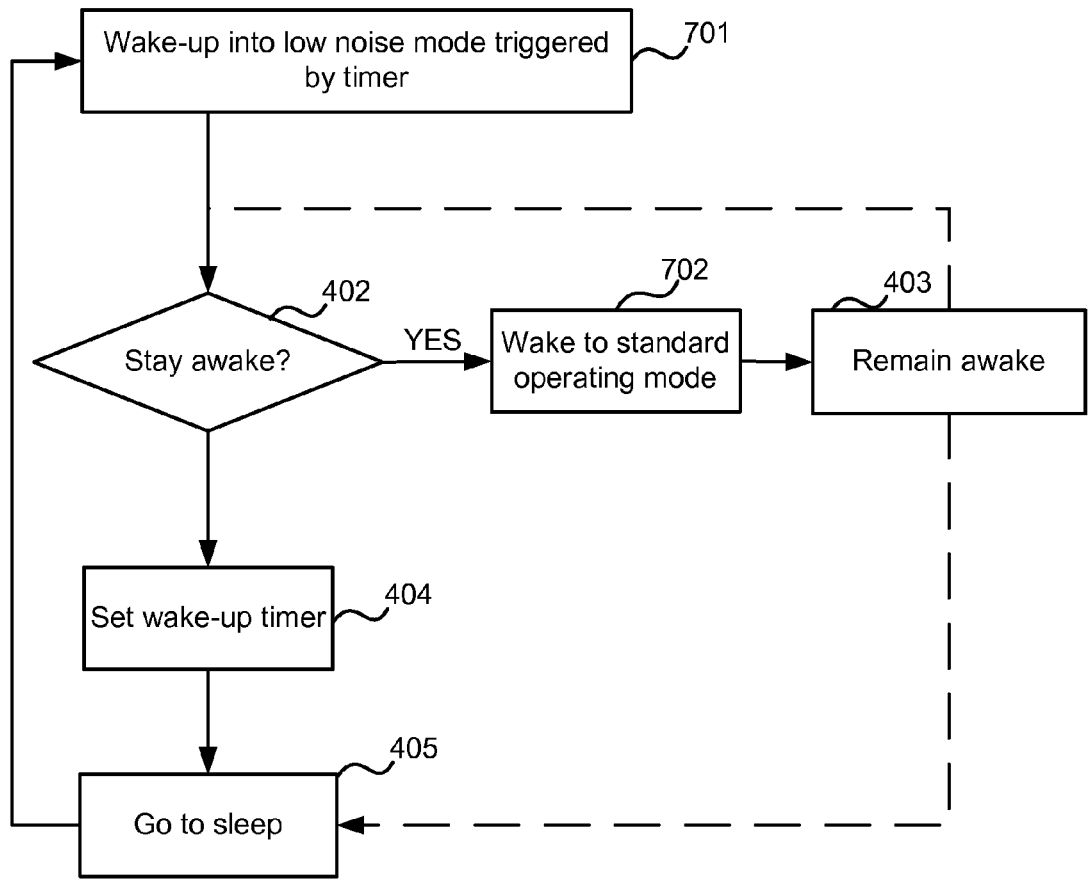
FIG. 7 is a flow diagram of another example method of operation of a duty cycling computer.

When the duty cycling computer wakes (as in block 401), the computer may wake into a low noise mode, low light mode, and/or other low disturbance mode, (which may also be a low power mode) to minimize any disturbance caused by the periodic waking of the computer. As shown in FIG. 7, the duty cycling computer may initially wake into a low noise mode (block 701) and if it is determined that the computer should stay awake ('Yes' in block 402), the computer may then move from the low noise mode to a standard operating mode (block 702). In an example, the low noise mode may involve not turning on certain elements within the computer, such as the hard disks and internal fans. Other elements may also not be turned on to minimize disturbance and also reduce power consumption, such as the display, speakers and other peripherals such as printers. In some examples, a low power CPU (or low power core on a processor) may be used in such a low disturbance mode (e.g. a low power CPU on the motherboard or on a separate card, such as a network card). Other factors may also affect when the duty cycling computer moves from the low noise mode to a standard operating mode, e.g. the temperature of the processor. For example, if the temperature exceeds a threshold whilst the determination is being made regarding staying awake (in block 402), the duty cycling computer may switch on its internal fans.

The methods described herein may involve a central entity which may act as a message cache, a message forwarding entity or may have additional functionality (e.g. allowing computing devices to log on and publishing presence information). The central entity may, for example, be an IM or Live Mesh server. In another example, the central entity may be another device, such as a user's mobile telephone or PDA. In some examples, the central entity may comprise context information about the user, for example the user's current location (e.g. where the central entity is a portable device which may be carried by the user) or the user's current activities (e.g. based on calendar information or information obtained from context sensors).

Figure 8:
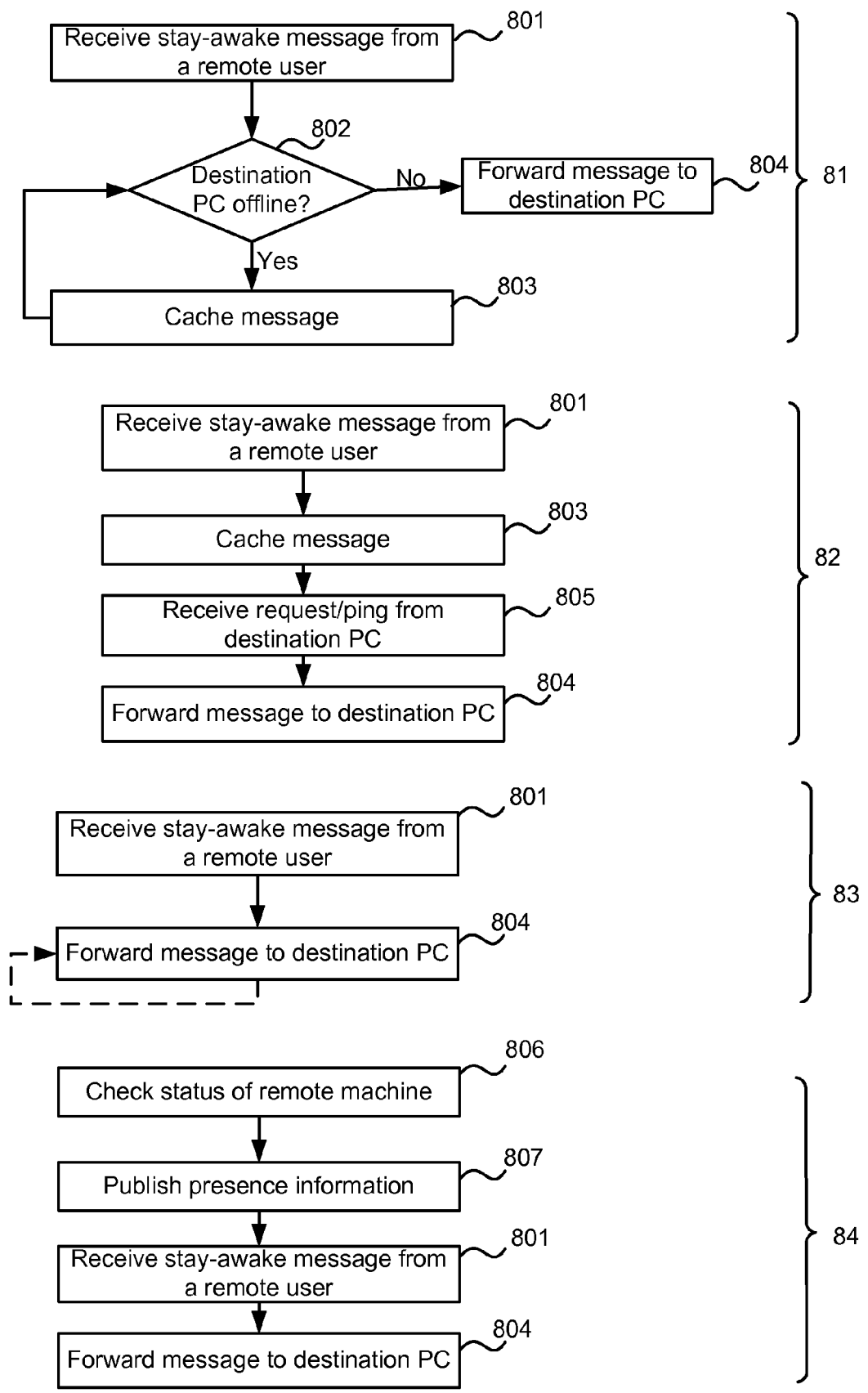
FIG. 8 shows flow diagrams of various examples of methods of operation of a central entity.

FIG. 8 shows various examples of the method of operation of a central entity. In the first example 81, the central entity caches stay-awake messages (in block 803) which are received (in block 801) whilst the duty cycling computer is asleep (as determined in block 802) and then the central entity forwards the messages (in block 804) once the duty cycling computer is awake. The central entity may determine whether the duty cycling computer is awake or not based on whether it is logged into the central entity or whether the central entity has recently received a message from the duty cycling computer. Alternatively, the central entity may forward the messages in response to a request message received (in block 805) from the duty cycling computer, as shown in the second example 82.

In a third example 83, the central entity may simply forward on the message received, either once or multiple times (e.g. as indicated by the dotted line and as shown in the third scenario 63 in FIG. 6). In a fourth example 84, the central entity publishes presence information (block 807) about remote machines (as ascertained in block 806) and forwards any stay-awake messages received (blocks 801 and 804, or alternatively blocks 801-804 in a corresponding manner to that shown in the first example 81). The presence information may relate to other machines in addition to the duty cycling computer.

Although the central entity is shown as a single element 303, it will be appreciated that the central entity may be a distributed device (e.g. a group of IM or Live Mesh servers). In further examples, there may be more than one central entity (e.g. an IM central entity and a Live Mesh central entity) which may operate independently or in collaboration to send stay-awake messages to the duty cycling computer.

In many of the examples, the central entity is shown as a forwarding device. However, in some examples, the central entity may apply a policy or other intelligence (e.g. based on a model of the duty cycling computer's activity, in a similar manner to that described above) in order to determine whether to forward a stay-awake message to a duty cycling computer. For example, the central entity may know what resources (e.g. files, applications, software licenses etc) can be found on each of a plurality of duty cycling computers 901-903 in a system (e.g. as shown in FIG. 9). In such an example, if the remote user asks for a particular file, the central entity may determine which of the duty cycling computers to send a stay-awake to. This determination may also involve use of context information, e.g. so that where the resource is available from more than one duty cycling computer, the stay-awake message is sent to the duty cycling computer which is most likely to wake up first.

In the examples described above, the stay-awake message relates to a specific device—the duty cycling computer 301. In other examples, the stay-awake message may be directed to a resource rather than a specific device or to any other attribute of a computer (e.g. minimum processing power, available processing capacity etc). For example, the stay-awake message may relate to a particular file and/or a particular application which may be available from more than one duty cycling computer 901-903 and which the remote user wishes to access.

Figure 10:
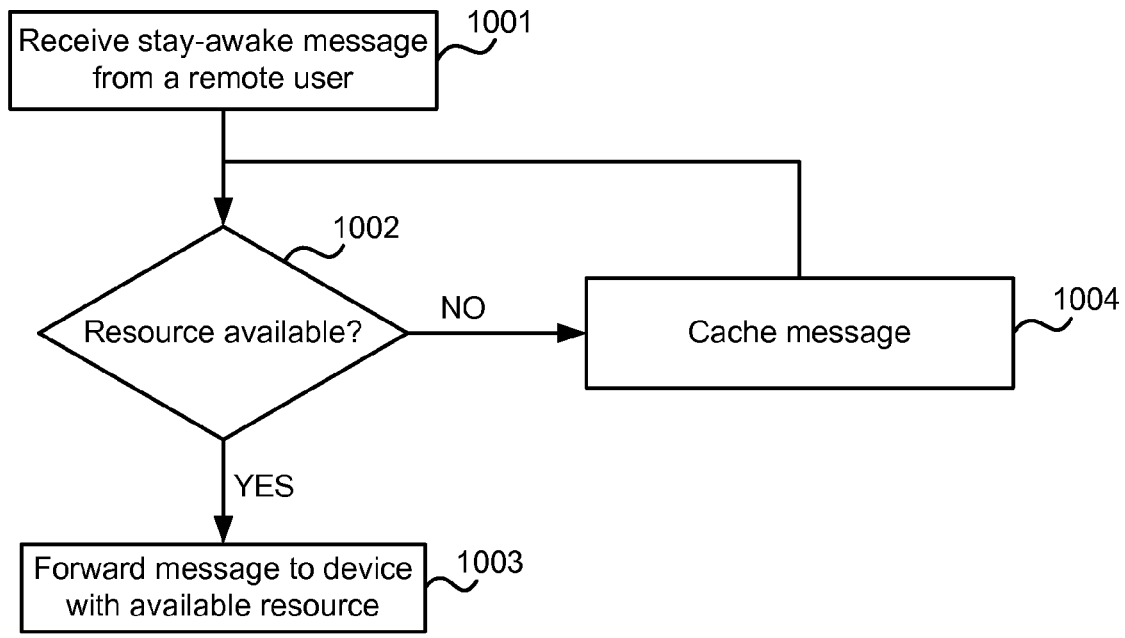
FIG. 10 is a flow diagram of another example of a method of operation of a central entity.

As above, the system may comprise a central entity 303 or a central entity may not be required. Where a central entity is used, its operation may be as shown in the example flow diagram of FIG. 10. In this example, a stay-awake message is received from a remote user (block 1001) which identifies a particular resource which is required (instead of relating to a particular duty cycling computer). If the resource is available ('Yes' in block 1002, i.e. a duty cycling computer with the resource is awake), the message is forwarded to the computing device (e.g. one of duty cycling computers 901-903) with the available resource (block 1003) and otherwise the message is cached (block 1004) until the resource becomes available. On receipt of the message, the duty cycling computer may make a determination to stay awake (e.g. as in blocks 402 and 403 of FIG. 4). In another example, the central entity may just forward the message (without determining whether it is available or not) one or more times, in a similar manner to the variations shown in FIGS. 6 and 8 and described above. The central entity may forward the message to all duty cycling computers, all duty cycling computers with the required resource, or it may use context information or machine learning to target the message at the duty cycling computer (or the set of duty cycling computers) which is most likely to wake up next, or it may wait until the first of the computers with the required resource contacts it (on wake up), and send the stay-awake message to that computer only.

In some examples, the sleep time (i.e. the time before the duty cycling computer will next wake up) may be communicated to the central entity (e.g. within block 404) to assist in targeting forwarding of stay-awake messages and/or so that the central entity can notify the remote user of the expected delay in accessing a resource or a particular duty cycling computer (e.g. through the user interface described above).

In the situation where there is no central entity, the remote computer may repeatedly send stay-awake messages to all duty cycling computers 901-903 which offer the required resource (in an analogous manner to example 62 in FIG. 6) until the resource becomes available. The sending of messages may be limited to within a group (e.g. friends in IM, my devices in Live Mesh).

Although FIG. 9 shows three duty cycling computers, in further examples the system may comprise one or more duty cycling computers and one or more computers which are not duty cycled. In such an example, the coordination between computers may be performed by one of the computers which is not duty cycling, in a similar manner to the operation of the central entity as described above.

In some examples, the stay-awake messages may be cryptographically signed to prevent unauthorized wake ups, or the central entity's normal authentication methods may be used (e.g. Live Mesh and IM both require a login process, so any messages received might only ever be from a logged-in and therefore trusted computer). The stay-awake messages might also be encrypted for privacy reasons—so that potentially private data such as the filenames, names of computers, types/descriptions of resources, names of users, etc are not divulged.

Figure 11:
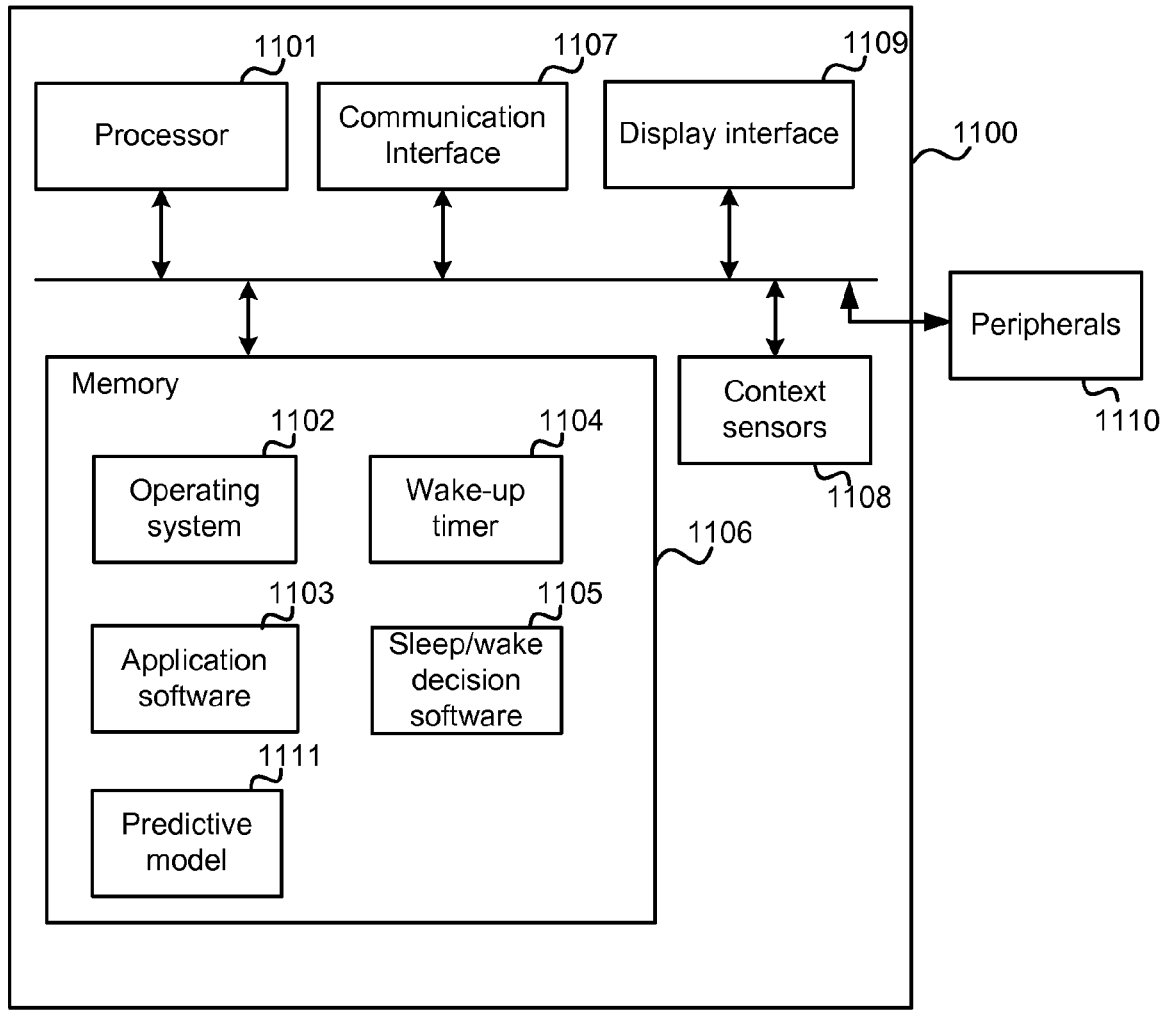
FIG. 11 illustrates an exemplary computing-based device in which embodiments of the methods described herein may be implemented.

FIG. 11 illustrates various components of an exemplary computing-based device 1100 which may be implemented as any form of a computing and/or electronic device, and in which embodiments of the methods described herein may be implemented.

Computing-based device 1100 comprises one or more processors 1101 which may be microprocessors, controllers or any other suitable type of processors for processing computer executable instructions to determine parameters associated with a power management policy and to implement this policy. In an example, the processors may process computer executable instructions to control the operation of the device in order to duty cycle the device and to determine whether to stay awake and how long to sleep for (i.e. to determine the duty cycling parameters).

Platform software comprising an operating system 1102 or any other suitable platform software may be provided at the computing-based device to enable application software 1103-1105 to be executed on the device. The application software may comprise a wake-up timer 1104 and decision software 1105 to determine whether to stay awake or not (e.g. to make the determination in block 402). The wake-up timer 1104 may include decision software to determine the length of time that the timer should be set to (e.g. in block 404) or this decision software may be provided separately or incorporated into the decision software 1105. In some examples, the computing-based device may also comprise a predictive model 1111. In other examples, a predictive model may not be used or the modeling functionality may be implemented within the decision software 1105.

Where a power management policy is implemented which does not involve duty cycling, the computing-based device may not comprise a wake-up timer 1104 and may comprise alternative decision software (instead of decision software 1105).

The computer executable instructions may be provided using any computer-readable media, such as memory 1106, or may be downloaded from a remote entity (e.g. the central entity or other entity via a network such as the internet). The memory 1106 may be of any suitable type such as random access memory (RAM), a disk storage device of any type such as a magnetic or optical storage device, a hard disk drive, or a CD, DVD or other disc drive. Flash memory, EPROM or EEPROM may also be used.

The computing-based device 1100 comprises a communication interface 1107 for receiving stay-awake messages and/or sending messages to remote entities (e.g. to the central entity 303 or the remote computer 304). The communication interface may also be used to receive information from remote context sensors and the computing-based device may comprise local context sensors 1108.

The computing-based device 1100 may also comprise a display interface 1109 and/or interfaces to one or more peripherals 1110. These peripherals may include a display, a printer etc and in some embodiments, these may not be powered up on wake-up, e.g. where the device initially wakes into a low noise mode as shown in FIG. 7. The computing-based device may also comprise one or more inputs and one or more outputs (not shown in FIG. 11).

In the methods described above, the duty cycling computer acts as a resource under the control of a remote user. In addition to stay-awake messages received from the remote user, stay-awake messages may also be received from other entities, e.g. automated application servers, such as update servers. Messages received from such servers may trigger operations, such as installing software updates. Although the duty cycling computer acts autonomously to wake up, the wake-up timer may be set based on input by the remote user and any decision about whether to remain awake, following wake-up, is dependent on messages received from the remote user. The messages may be received from the remote computer used by the remote user or from an intermediary device, such as a central entity.

In the examples described above, the remote user is a human user. However, in further examples, the remote user may comprise a software agent running on the remote computer that is making requests on behalf of a human user. The human user may explicitly direct the remote software agent to perform certain actions, or may configure general policies which the software agent then carries out, or the software agent may infer the human user's needs less directly via a variety of techniques, including but not limited to, sensor input, or applying machine learning techniques to learn the human user's patterns of behavior.

The duty cycling of the computing device reduces the power consumption of the computing device whilst the methods described herein still enable the computing device to be accessed by a remote user without too much of a delay. In some examples, the expected delay may be communicated to the remote user. The reduction in power consumption may result in lower operating costs, increased battery life, reduced noise (as fans can operate less often or at lower speeds), smaller/lighter batteries, longer equipment lifetime (e.g. as some of the components of the computer, such as the fans, may not be switched on initially on wake up), reduced environmental impact (e.g. $CO_2$ reduction) etc. Additionally, the duty cycling of the computing device improves user convenience and user friendliness, as the user need not be concerned about whether a computing device is on or off.

Although the present examples are described and illustrated herein as being implemented in a system as shown in FIGS. 1, 3 and 9 with computing devices connected via a network, the system described is provided as an example and not a limitation. As those skilled in the art will appreciate, the present examples are suitable for application in a variety of different types of systems comprising a plurality of interconnected computing devices.

Furthermore, although the present examples are described as being implemented in order to reduce the power consumption of the duty cycling computer, there may be other applications for the methods described herein and the implementation of the methods may be for any reason or benefit.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements. It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more tangible device-readable media with device-executable instructions recorded thereon, the instructions comprising:
   instructions for setting parameters of a power management policy for at least a part of a computing device based on at least one of:
   a predictive model generated using usage data derived from user behavioral data; or
   signaling received from a remote computing device and the signaling being indicative of user preference for setting the parameters, the power management policy being changed to reduce an amount of sleep time when a threshold frequency of received stay-awake messages is met.

2. One or more tangible device-readable media according to claim 1, wherein the predictive model is arranged to forecast when the computing device will next be used based on the usage data.

3. One or more tangible device-readable media according to claim 1, wherein the power management policy comprises a policy for duty cycling at least a part of the computing device.

4. One or more tangible device-readable media according to claim 1, wherein the device-executable instructions for setting parameters of a power management policy comprise device-executable instructions for performing steps comprising:
   determining whether a computing device should remain awake for an extended period of time based on an input by a remote user via a remote computing device, determining whether the computing device should remain awake including determining the computing device should remain awake when the input indicates the remote user is at the same location as the first computing device or the remote user is traveling to the same location as the first computing device; and
   setting a wake-up timer to trigger the computing device to wake up, prior to the computing device going to sleep.

5. One or more tangible device-readable media according to claim 4, wherein the determination whether the computing device should remain awake is made on wake up.

6. One or more tangible device-readable media according to claim 4, further comprising device-executable instructions for performing steps comprising:
   causing the computing device to go to sleep; and
   triggering the computing device to wake up according to the wake-up timer.

7. One or more tangible device-readable media according to claim 6, wherein triggering the computing device to wake up according to the wake-up timer comprises:
   triggering the computing device to wake up into a low disturbance operating mode according to the wake-up timer, the low disturbance mode maintaining a sleep status of at least one of a hard drive, a fan, a speaker, a display or a processor.

8. One or more tangible device-readable media according to claim 4, wherein determining whether a computing device should remain awake for an extended period of time based on an input by a remote user via a remote computing device comprises:
   listening for a stay-awake message.

9. One or more tangible device-readable media according to claim 8, wherein determining whether a computing device should remain awake for an extended period of time based on an input by a remote user via a remote computing device further comprises:
   on receiving a stay-awake message, causing the computing device to remain awake for an extended period of time.

10. One or more tangible device-readable media according to claim 8, wherein determining whether a computing device should remain awake for an extended period of time based on an input by a remote user via a remote computing device further comprises:
    sending a message to a remote entity.

11. One or more tangible device-readable media according to claim 10, wherein the remote entity is one of the remote computing device and a central entity.

12. One or more tangible device-readable media according to claim 8, wherein determining whether a computing device should remain awake for an extended period of time based on an input by a remote user via a remote computing device further comprises:
    causing the computing device to remain awake for a short period of time to listen for a stay awake message.

13. One or more tangible device-readable media according to claim 8, wherein the stay-awake message is a message from a central entity.

14. One or more tangible device-readable media according to claim 4, wherein information from context sensors is used in at least one of:
    determining whether the computing device should remain awake for an extended period of time; or
    setting the wake-up timer.

15. One or more tangible device-readable media according to claim 4, wherein at least one of: information from said input by the remote user or information about a duty cycle of another computing device is used in at least one of:
    setting a length of said extended period of time; or
    setting the wake-up timer.

16. A system comprising:
    a first computing device connected to a second computing device via a network, the second computing device remote from said first computing device;
    wherein the first computing device comprises:
    at least one of a wake-up timer and a predictive model which triggers the first computing device to wake from a low power state; or
    decision software arranged to determine whether to remain awake based on an input by a remote user at said second computing device, the decision software determining to remain awake when the input indicates the remote user is at the same location as the first computing device or the remote user is traveling to the same location as the first computing device.

17. A system according to claim 16, further comprising:
a central entity, connected to the first and second computing devices via the network, and wherein the first computing device further comprises:
a communication interface for receiving a message from the central entity,
and wherein the decision software is arranged to determine whether to remain awake based on whether a message is received from the central entity, said message being associated with said input by a remote user, the decision software being further arranged to reduce an amount of sleep time when a threshold frequency of received stay-awake messages is met.

18. A system according to claim 16, further comprising a wake-up timer which triggers the first computing device to wake to a low disturbance mode, the low disturbance mode maintaining a sleep status of at least one of a hard drive, a fan, a speaker, a display or a processor, the decision software being arranged to determine whether to awake the at least one of the hard drive, the fan, the speaker, the display or the processor.

19. A system according to claim 16, wherein the first computing device further comprises software arranged to set the wake-up timer based on at least one of said input by a remote user, information from context sensors, historical behavior, or duty cycling information received about another computing device in the system.

20. One or more tangible device-readable media with device-executable instructions for performing steps comprising:
waking a computing device from a sleep state to a low disturbance mode, the low disturbance mode maintaining a sleep status of at least one of a hard drive, a fan, a speaker, a display or a processor based on a wake-up timer;
listening for a message indicative of a request by a remote user made via a remote computing device for a first period of time; and
on receipt of a message indicative of a request by a remote user made via a remote computing device, causing the computing device to remain awake for a second period of time and waking the at least one of the hard drive, the fan, the speaker, the display or the processor,
wherein the second period of time is longer than the first period of time.

* * * * *